I. W. COLBURN.
METHOD AND APPARATUS FOR MAKING SHEET GLASS.
APPLICATION FILED JAN. 8, 1916.

1,248,809.

Patented Dec. 4, 1917.
2 SHEETS—SHEET 1.

Fig. 1.

Inventor
Irving W. Colburn
By Whittemore Hulbert & Whittemore
Attys

I. W. COLBURN.
METHOD AND APPARATUS FOR MAKING SHEET GLASS.
APPLICATION FILED JAN. 8, 1916.

1,248,809.

Patented Dec. 4, 1917.
7 SHEETS—SHEET 4.

Inventor
Irving W. Colburn
By Whittemore Hulbert & Whittemore
Attys

I. W. COLBURN.
METHOD AND APPARATUS FOR MAKING SHEET GLASS.
APPLICATION FILED JAN. 8, 1916.

1,248,809.

Patented Dec. 4, 1917.
7 SHEETS—SHEET 7.

Inventor
Irving W. Colburn

By Whittemore Hulbert & Whittemore
Attorney

UNITED STATES PATENT OFFICE.

IRVING W. COLBURN, OF TOLEDO, OHIO, ASSIGNOR TO THE TOLEDO GLASS COMPANY, OF TOLEDO, OHIO, A CORPORATION OF OHIO.

METHOD AND APPARATUS FOR MAKING SHEET-GLASS.

1,248,809.   Specification of Letters Patent.   Patented Dec. 4, 1917.

Application filed January 8, 1916. Serial No. 70,927.

*To all whom it may concern:*

Be it known that I, IRVING W. COLBURN, a citizen of the United States of America, residing at Toledo, in the county of Lucas and State of Ohio, have invented certain new and useful Improvements in Methods and Apparatus for Making Sheet-Glass, of which the following is a specification, reference being had therein to the accompanying drawings.

The invention consists in a method and an apparatus for making sheet glass by continuously drawing a sheet from a supply of molten glass, and particularly in improvements whereby the sheet may be drawn clear, flat and free from abrasive marks or marring, whereby a fine quality of glass is produced, as more fully hereinafter set forth and particularly pointed out in the claims.

The method and apparatus herein shown constitute an improvement upon the method and apparatus shown and described in my prior patents, such, for instance, as in Patents Nos. 966,652 and 1,122,692, and in Patent 876,267, to E. Washburn and myself; and renders certain the obtaining of sheet glass free from marring by the drawing apparatus, and perfectly flat, that is, free from undulations or waves.

Figure 1:
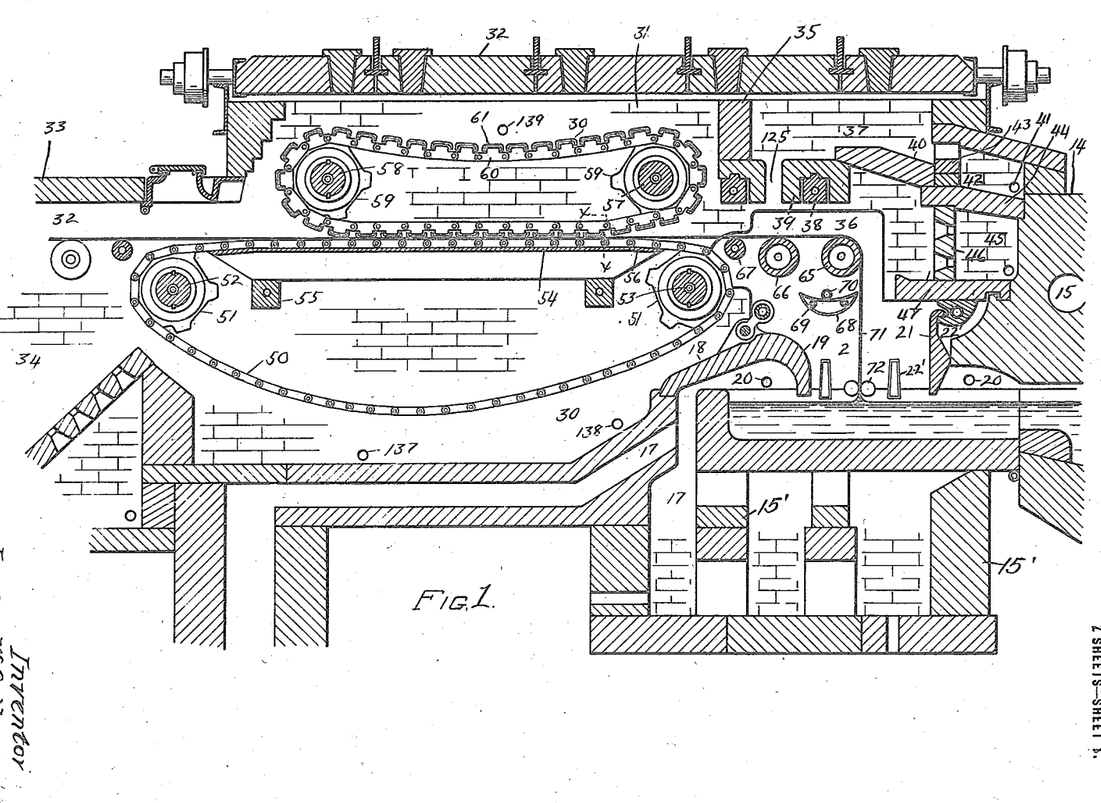
Figure 1 is a vertical, central, longitudinal section through a glass drawing apparatus embodying my invention.

1 represents the continuous tank in which the batch is melted and from which it flows into the cooling tank, 2, this cooling tank being shallower than the melting tank. At the forward end of the cooling tank is a drawing tank, 3, preferably made of a tile substantially trough-shaped in cross-section; these tanks being in connection so that the glass can flow from the melting tank through the cooling tank and into the drawing tank.

The cooling tank is provided with a roof, 4, shown of substantially the height of the roof, 5, of the melting tank, and an arch, 6, separates this section of the roof from the section 7 thereof at a less height. Besides the arch 6 and through the roof 7 I show a vertically adjustable gate, 8, which may be raised and lowered to let more or less heat from the chamber in the melting tank into the cooling chamber.

In the roof 7 I also show an opening, 9, which may be more or less open or closed by means of a tile or brick, 10, to also control the temperature in the cooling chamber.

12 are suitable openings in the side-walls, which in the use of the device may be bricked up but which may be opened for access to the interior of the tanks.

At the forward end of the cooling tank and above the level of the glass therein is an arch, 14, preferably provided with a cooling passage, 15.

The drawing tank 3 is supported on the walls 15' of a heating chamber, 16, into which gaseous flame is ordinarily directed, suitable passage-ways for the flame being provided, and at the end of the heating chamber is an outlet flue, 17.

At the outer end of the drawing tank I have shown the cover tile, 18, extending inwardly and having the depending lip, 19, extending down in proximity to the glass; this tile being spaced from the top of the drawing tank to leave a passage into the outlet flue, 17; 20 indicating a burner for directing the gas flame into the space beneath this tile and above the level of the glass in the drawing tank. At the other end of the drawing tank I provide a curtain tile, 21, which I have shown as supported by the cross-bar, 22, by hooked engagement between the two members. Between these tiles is left sufficient exposed space from which the glass in the drawing tank may be drawn. I have also indicated hollow water-cooled shields, 22′, on opposite sides of the drawing point.

Beyond the end of the drawing tank is a draft-applying chamber, 30, formed by the walls 31 and the roof, 32. This draft-applying chamber at its farther end connects with the leer-chamber 32, of which 33 is the roof and 34 the side walls. The inner end of this chamber is partially closed by an arch, 35, which I have shown as substantially over the outer end of the drawing tank.

Between what I call the draft-applying chamber, that is, the chamber in which the draft or drawing power is applied, and the arch 14 is an exposed surface of the drawing tank, from which the sheet is taken, and as this is merely a space with a roof over it, in which the vertical portion of the drawn sheet extends, I call this space, 36, the drawing-shaft or well.

The roof 32 extends over the drawing-shaft and a heating chamber 37 is formed above the same, within the side-walls, 31, which are extended, as shown, to meet the arch 14. The heating chamber 37 has its bottom formed by a cross-bar, 38, and tile cover, 39, therefor and a bottom tile, 40. I have shown the heat therefor supplied from a burner, 41, in a chamber, 42, there being an apertured wall 43 between the chambers 37 and 42. The bottom of the chamber 42 is formed by a horizontal partition, 44, and below this is formed another heating chamber, 45, having a front perforated wall, 46, and a bottom tile, 47.

The draft-applying mechanism in the chamber 30 comprises an endless drawing table, 50, composed of links connected by suitable cross-rods, said table passing over sprocket-wheels, 51, which are upon cross-shafts 52 and 53. The drawing portion of this table rests upon a guide-way, 54, supported on cross-bars, 55, the guide way having slightly inclined ends, 56. Above this drawing table are cross-shafts, 57, 58, having thereon sprocket wheels, 59, over which pass two oppositely disposed endless chains 60 whose opposite links are connected by cross-bars 61; the shaft, sprocket-wheels, endless chain and cross-bars being supported by spring-supports, 62 (Fig. 2), so that substantially the entire weight of the lower horizontal run of the chain will rest upon the glass sheet, which in turn rests on the drawing table passing over the guides 54.

Forward of the drawing table and in the drawing-shaft is a bending roll, 65. Immediately to the rear of this bending roll is an intermediate roll, 66, preferably of the same diameter; and between the roll 66 and the drawing table is a smaller roll, 67. These rolls are hollow and are cooled by air or water, or both, as will be hereinafter described.

Below the bending roll 65 is a transverse hollow cooling chamber, 68, provided with a water inlet and outlet pipes, 69. Above the cooling chamber 68 is an air supply pipe 70 having perforations in its upper portion through which air may be directed against the face of the roll 65 immediately prior to the contact of said roll with the sheet 71 as said sheet passes from the tank to the drawing chamber.

72 are driven knurled rollers, applied to the edge of the sheet in the manner and for the purpose hereinafter set forth.

I have shown in Fig. 2 the drive mechanism for these parts so far as it is necessary in this application to show the same. 73 is the drive shaft which, by beveled gears, 74, drives the horizontal shaft 75; and other gearing (to be hereinafter described) drives the horizontal shaft 76. This shaft 76 has upon it a worm, 77, meshing with a worm-wheel, 78, on a shaft, 79, which, by means of a sprocket-chain, 80, passing over the sprocket-wheel on the shaft 79 and a sprocket-wheel, 81, on the shaft 58, drives the endless chain 60 carrying the grip-bars 61. This shaft, 76, also has upon it a worm, 82, meshing with a wormwheel 83, on the shaft 52, which drives the drawing table; and it also has upon it a worm, 84, meshing with a worm-wheel, 85, on a stub-shaft, 86, which has thereon two sprocket-wheels (not shown), one sprocket-wheel having a chain, 87, passing thereover and passing over a sprocket-wheel on the shaft which is secured to the roll 67, and the other sprocket-wheel (not shown) over which passes a chain, 88, which engages sprocket-wheels on the shafts of the rolls 65 and 66, to drive those rolls at uniform speed and in the same direction, as clearly shown in Fig. 2.

In the ordinary drawing operation the worm 82 driving the worm-wheel 83 is the driving means for the drawing table.

Figure 9:
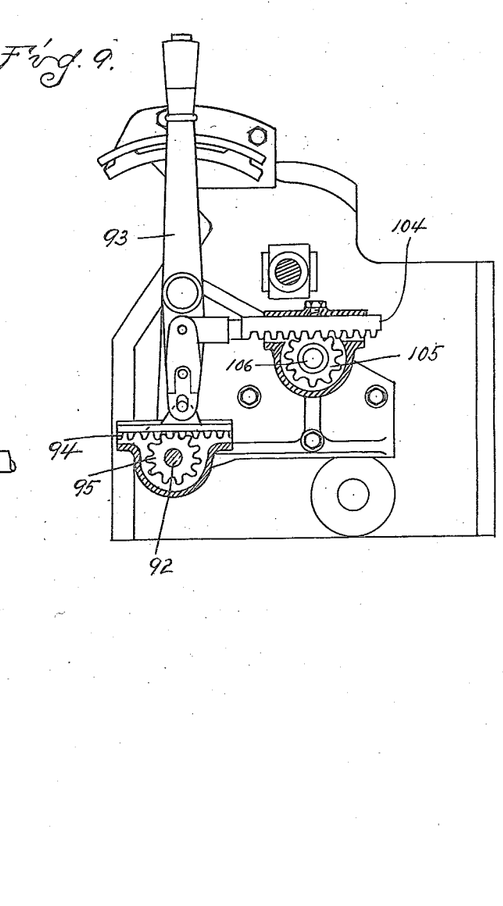
Fig. 9 is a side elevation thereof, with parts of the casing in section.

In starting it is desirable to move the drawing table in the opposite direction and to get this reverse of the drawing table I employ the following mechanism: The worm 84 meshes with a worm-wheel, 89, which in the ordinary drawing operation is loose on the shaft 53. When the drawing table is reversed the worm-wheel 89 is clutched to the shaft 53 and the worm-wheel 83 is disconnected by a clutch from its shaft and the direction of the rotation of the shaft 76 is reversed. The two clutches for effecting this result, 90 and 91, are adapted to be simultaneously thrown by means of a rock-shaft, 92, journaled on the side of the machine. This shaft is adapted to be rocked by a lever, 93, which at its lower end has upon it a rack, 94, engaging with a pinion, 95, on the shaft 92 (Fig. 9).

To reverse the direction of the drive of the shaft 76 I employ a rocking frame, 96, (Fig. 10), journaled on a shaft, 97, adjacent to a pinion, 98, on the shaft 76. The pinion 95 meshes with the pinion, 99, on the shaft 97; and in the direct drive, the pinion 99 drives a pinion, 100, which in turn meshes with a gear, 101, on the shaft 76.

Figure 10:
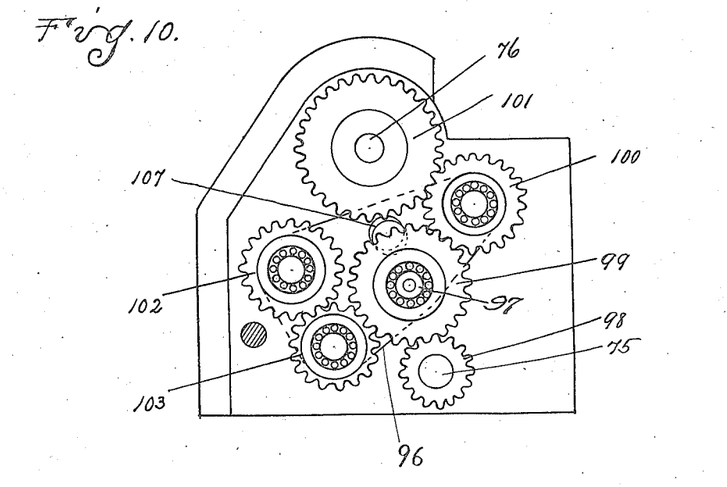
Fig. 10 is a side elevation of the reverse gear casing and mechanism.

When it is desired to reverse the direction of drive the rocking frame 96 is rocked so as to disengage the pinion 100 from the gear 101, and to engage a gear, 102, with the gear 101, which gear is driven by an intermediate gear, 103, meshing with the gear 99.

The rocking of the frame 96 is effected by the lever 93 (Fig. 9) by means of a rack-bar, 104, engaging a pinion, 105, on a stub-shaft, 106, upon which is an eccentric, 107, (Fig. 10), engaging the rocking frame 96 to rock the frame from one position to the other. Any other form of reverse mechanism may be employed. There are two pairs of knurled rollers one for each edge of the sheet. The driving mechanism for these knurled rollers is shown in Fig. 2, 110 being a gear between the shaft 75 and a shaft 111. Between the shaft 111 and a drive shaft, 112, is a variable speed gear connection, 113; the operator by suitable mechanism (not shown) being able to connect any one of the gears 114 with the drive-gear on the shaft 111, so as to give a variable speed to the knurled rollers.

The knurled roll shafts, 115, (see Fig. 11) are geared together by gears 116, and one of the shafts has upon it a beveled gearwheel, 117, meshing with a beveled gear, 118, on the shaft 112.

Figure 2:
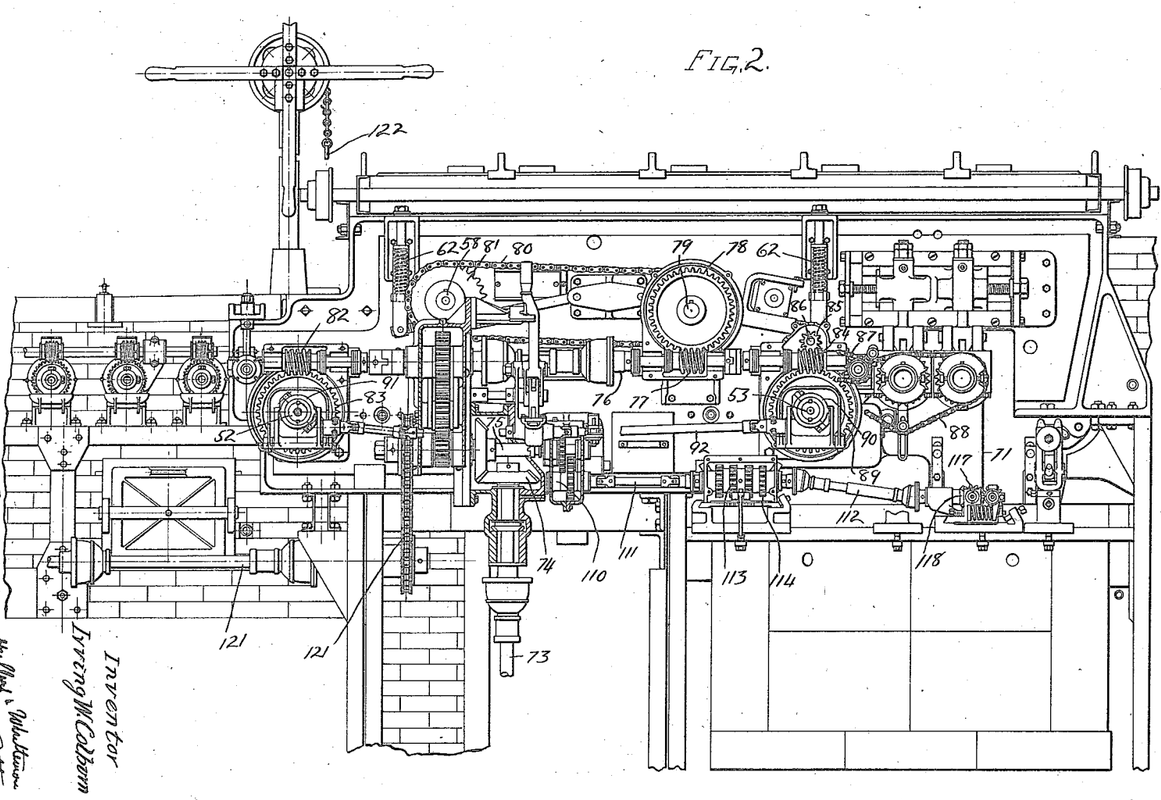
Fig. 2 is a side elevation thereof, showing the drawing mechanism, parts being broken away and parts in section, the water supply pipes being omitted to enable the drawing to be more readily understood.
Figure 3:
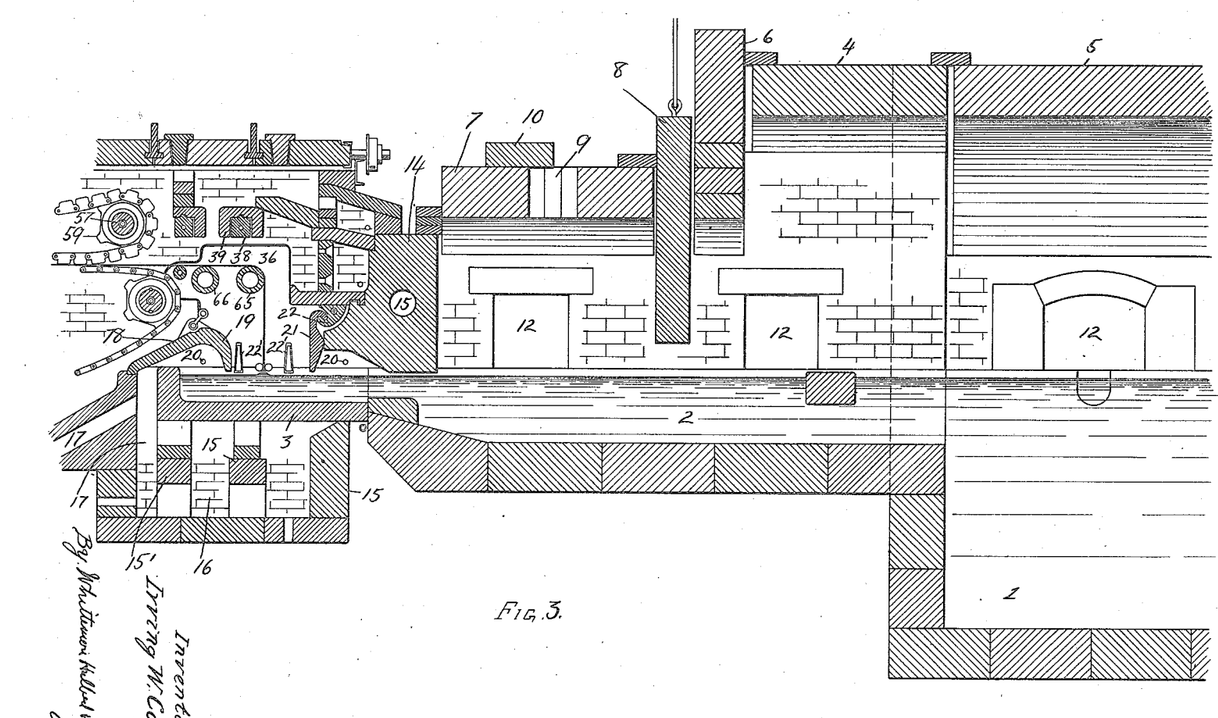
Fig. 3 is a section similar to Fig. 1 showing only a portion of the drawing mechanism and showing the construction of the glass tank.

It is to be understood that a drive connection is provided from the side of the machine shown in Fig. 2 to the opposite side for the similar rolls upon such opposite side of the machine. This is obvious and need not be illustrated.

The shaft 75, (Fig. 2) by means of a sprocket-chain, 120, and horizontal shaft, 121, may be driven, and this in turn, by suitable gearing (not shown) may be used to drive the leer carrier in the leer—into which the glass sheet passes from the drawing table, and in which it is gradually cooled.

These drive connections and driving mechanism in detail form no part of my present invention and I do not deem it necessary to further illustrate the same.

The starting of the apparatus is well understood from my previous patents. The bait, 122 (Fig. 2) being lowered upon the drawing table and the table reversed will carry the bait toward the drawing-shaft, dropping down over the bending roll, 65, into the molten glass; and after the glass has adhered to the bait the travel of the table is reversed, slowly lifting the bait from out of the molten glass with the glass in sheet form adhering thereto. By the continued movement of the table, the bait will be drawn upward over the bending roll 65, and as the bait advances across the drawing table, the sheet will be bent over the bending roll and drawn onto the table. The bait may then be broken off, and the sheet of glass will pass from the drawing table into the leer, being received upon the leer carrier.

The knurled rollers will then be caused to engage the edges of the glass sheet, where they serve not only the function of maintaining the uniform width of the sheet, but also the additional functions of applying a drawing power to the edge portions of the sheet (if their speed be adjusted so as to be less than that of the drawing table), and supplying a yielding resistance to the drawing action of the table.

In drawing glass with apparatus of the character described in my aforementioned patents, much difficulty has been experienced in producing flat glass free from wavelines and in preventing the marring of the sheet in passing over the bending roll and through the draft-applying apparatus, with resulting injury to the commercial value of the product. I have discovered that I can entirely eliminate these difficulties by the method of procedure and construction of apparatus which I will now proceed more particularly to describe.

It will be understood that the sheet as a whole is drawn by reason of the advancing action of the drawing table and the grip bars between which bars and table the sheet is clamped. This places a tension on the sheet (as a whole) from the drawing table to the sheet-forming point adjacent the molten mass of glass. I have discovered that it is desirable to apply a different tension to the edges of the sheet as compared with that portion of the sheet between its edges. I apply this additional tension to the edge portions of the sheet by driving the knurled rollers 72 at a speed materially slower than the speed at which the glass is drawn from the tank; that is, I provide a driving mechanism for these knurled rollers which will drive the same at a peripheral speed less than the speed of the drawing table. I find that good results are obtained when the peripheral speed of the knurled rollers 72 is from 10% to 20% less than that of the drawing table.

Figures 11, 12, 14:
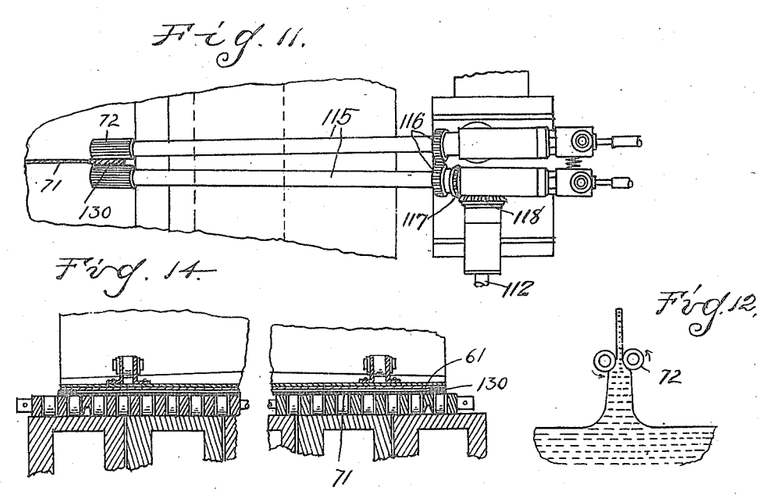
Fig. 11 is a plan view of one of the knurled rolls used at the edge of the sheet.
Fig. 12 is an end elevation of those rolls, showing the relation of the glass thereto during the drawing operation.
Fig. 14 is a section through the drawing table and clamping bars, showing the glass sheet between, as in the process of drawing.

By spacing these knurled rollers a distance apart exceeding that of the thickness of the main body of the sheet 71, a thickened or beaded edge portion 130 is formed at each edge of the sheet, as will be clearly understood by an inspection of Figs. 11 and 12.

In order to prevent the bending roll from marring or defacing the drawn sheet, I cool that surface of the sheet which is to come in contact with the bending roll just prior to its contact therewith, and also supply means for cooling that portion of the surface of the bending roll that is just about to come in contact with the glass. A suitable and effective means for this purpose is shown in the water cooler 68 located immediately adjacent to that face of the sheet 71 which is to contact with the bending roll, and also closely adjacent to the under face of the bending roll itself. Preferably, though not necessarily, I also supply the cooling air current for action upon the surface of the roll and the surface of the sheet just prior to their contact with each other. This I accomplish by blowing a current of air through a pipe 70, which pipe is provided with a longitudinally extending series of perforations for directing a cooling current of air upon the roll and the face of the sheet just before it contacts with the roll.

Figure 4:
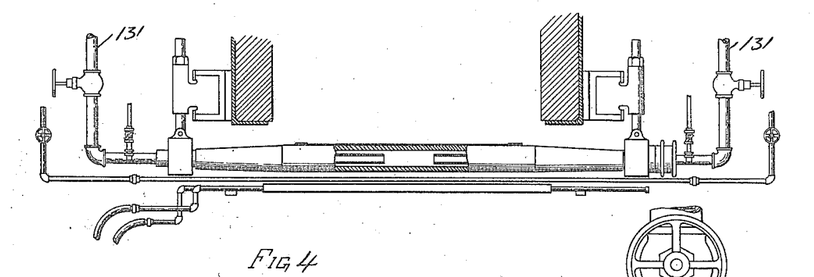
Fig. 4 is a sectional elevation of the bending roll and connections, together with the cooling device below the same.
Figure 5:
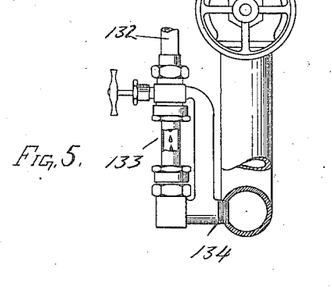
Fig. 5 is an elevation, partly in section, of the air and water connection to the bending roll.
Figure 6:
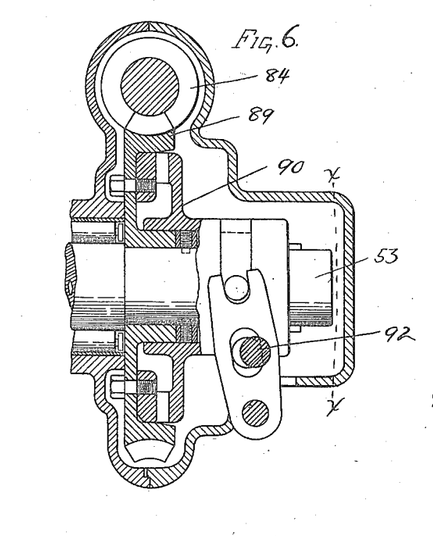
Fig. 6 is a section through the drive mechanism for the drawing table.
Figure 7:
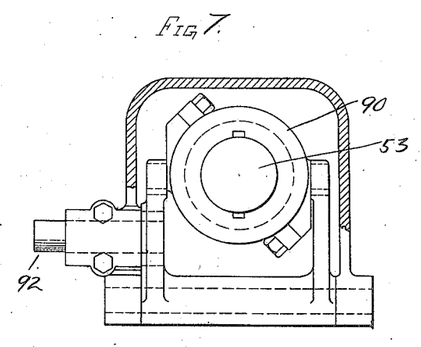
Fig. 7 is a section on line $x$—$x$ of Fig. 6.
Figure 8:
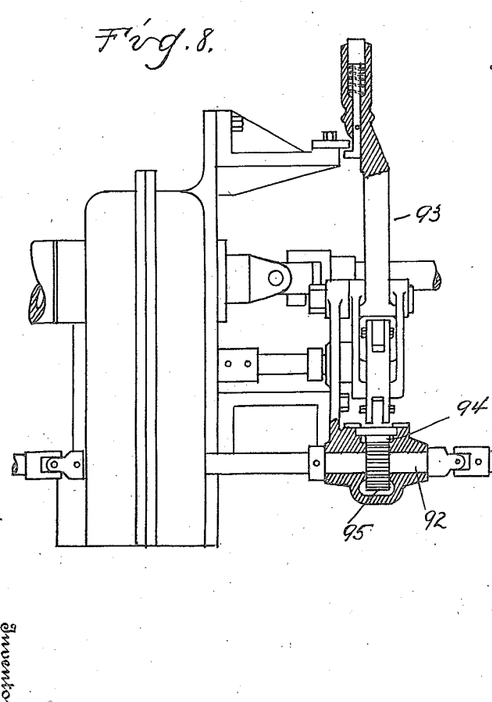
Fig. 8 is a front elevation of the reverse lever and connections.

In addition to the surface cooling of the bending roll, I also cool said roll from within, preferably by means of a water spray or other cooling agent. This may be accomplished, as shown in Fig. 4, by leading the air pipes 131 into each end of the bending rolls, and directing water into these air pipes by means of the pipes 132 connected with a suitable water supply, a suitable gage 133 being provided to show the amount of water entering therein; the pipe 132 having a side connection, 134, into the air pipe, as shown in Fig. 5. The air blowing through the pipe will pick up the water as it comes and spray it into the interior of the bending roll, there being a suitable outlet (not shown) at one end of the roll for the accumulating water.

Inasmuch as the sheet glass is drawn up into an open air space and not into a chamber, to prevent it from cooling too rapidly and hardening to a degree which will prevent its bending readily over the bending roll, I apply heat to the upper portion thereof by a gas flame in the heating chamber 45 directed upon the outer surface of the sheet substantially at the bending roll, as clearly shown in Fig. 1.

As the sheet is bent from the vertical to the horizontal over the bending roll it is materially lowered in temperature and if it is passed immediately to the drawing table it is liable to have slight undulations or waves in it. To prevent the possibility of this and to perfectly "flatten" the sheet (*i. e.*, remove or prevent the formation of said undulations or waves), I pass it over suitable supports between the bending roll and drawing table and re-heat it at this point to soften it sufficiently so that it may flatten upon the drawing table. By reference to Fig. 1, it will be seen that the grip-bars do not contact with the sheet until the same has traveled for an appreciable length of time on the drawing table, after the latter has passed the incline 56 on the guide 54 and therefore become perfectly level.

This re-heating of the glass in its horizontal run is accomplished by means of the flame passing downward from an outlet slot, 125, from the chamber 37 and impinging upon the upper surface of the sheet after it has left the bending roll.

Figure 13:
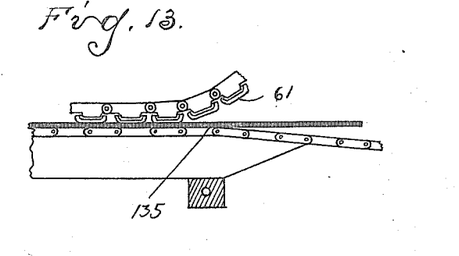
Fig. 13 is an enlarged elevation of one end of the drawing table, to illustrate more clearly than can be illustrated in the small drawing of Fig. 1 the manner of flattening the sheet upon the table before the clamping means are applied thereto.

To enable the glass to "flatten" or lie perfectly smooth before the presser-bars or grip-bars grasp it I arrange the table in such relation to the grip-bars that there is a flat portion 135 (Fig. 13), upon which the glass will have an opportunity to flatten before the grip-bars 61 contact it.

With the knurled rollers spaced far enough apart to form the beaded or thickened edge 130 (Fig. 11), it will be apparent that the beaded or thickened portion on that side adjacent to the bending roll will be more or less flattened out, leaving an upwardly projecting thickened portion on the upper side of the edge portions of the sheet, as clearly shown in Fig. 14. And this thickened portion will be engaged by the grip bars, leaving the middle or body portion of the sheet untouched by said grip bars, thus preventing any marring of the surface portion of the sheet proper by the drawing apparatus.

The intermediate supporting rolls 66 and 67 and the knurled rolls 72 may be water cooled in the well-known manner.

With this apparatus I am able to continuously produce sheet glass of good quality, clear, free from defects and flat.

I claim:

1. The method of drawing sheet glass which consists in preparing a mass of molten glass, drawing a sheet of glass vertically therefrom, then bending the drawn sheet over a surface-cooled roll, applying draft to the sheet horizontally from the bend and then annealing it.

2. The method of drawing sheet glass which consists in preparing a mass of molten glass, drawing a sheet of glass vertically therefrom, bending the drawn sheet over a surface-cooled roll, cooling that surface of the sheet which contacts with the roll just prior to its contact with the roll, advancing the sheet horizontally from the bend and then annealing it.

3. The method of drawing sheet glass which consists in preparing a mass of molten glass, drawing a sheet of glass vertically therefrom, passing the drawn sheet vertically through a cooling space and thence into a heated space, bending the sheet to the horizontal, raising the temperature of the horizontal run of the sheet to soften the same, and then gradually cooling the same.

4. The method of drawing sheet glass which consists in preparing a mass of molten glass, drawing a sheet of glass vertically therefrom, hardening one face of the drawn sheet, then bending the sheet over a roller with the hardened face of the sheet in contact therewith, and then advancing the sheet horizontally from said roller.

5. The method of drawing sheet glass which consists in preparing a mass of molten glass, drawing a sheet of glass vertically therefrom, hardening one face of the drawn sheet by cooling, bending the sheet over a roll with the hardened face of the sheet in contact with the roll, heating the horizontal run of the sheet to soften the same, and then gradually cooling the sheet.

6. The method of drawing a continuous sheet of glass, which consists in preparing a continuing supply of molten glass, continuously drawing a sheet of glass vertically therefrom, lowering the temperature of the drawn sheet and cooling one face of the sheet more than the other, and then bending the drawn sheet from the vertical to the horizontal with the cooler surface in contact with the bending means.

7. The method of drawing a continuous sheet of glass, which consists in preparing a continuing supply of molten glass, continuously drawing a sheet of glass vertically therefrom, lowering the temperature of the drawn sheet and cooling one face thereof more than the other, bending the sheet to the horizontal with the cooler surface in contact with the bending means, softening the horizontal run of the sheet by heat, flattening the softened sheet, and then gradually cooling the same.

8. The method of drawing sheet glass which consists in preparing a mass of molten glass, drawing a sheet of glass therefrom with edge portions thicker than the body of the sheet, reheating the drawn sheet to soften the same, flattening the softened sheet, and applying the drawing means to the thick edge portions only of the flattened sheet.

9. The method of drawing sheet glass, which consists in preparing a mass of molten glass, drawing a sheet of glass therefrom with its edge portions thicker than the remainder of the sheet, partially cooling the drawn sheet, reheating to soften the sheet, flattening the softened sheet, and applying the drawing power to the edge portions only of the flattened sheet.

10. The method of drawing sheet glass which consists in preparing a mass of molten glass, drawing a sheet of glass therefrom having edge portions thicker than the remainder of the sheet, partially cooling the sheet, and applying the drawing power to the thick edge portions only of the partially cooled sheet.

11. The method of drawing sheet glass which consists in preparing a mass of molten glass, drawing a sheet of glass therefrom with the edge portions of the sheet cooler than the body portion thereof, and applying at or near the formative point of the edge portions of the sheet a yielding mechanical resistance to the drawing force other than the resistance due to the viscosity of the glass.

12. The method of making sheet glass which consists in preparing a mass of molten glass, drawing a sheet of glass therefrom with the edges cooler than the body portion by applying a drawing action to the sheet as a whole and applying an initial drawing action to the edge portions of the sheet, which initial action draws the edge portions of the sheet from the molten mass at a lower rate of speed than that of the drawing action for the sheet as a whole.

13. In a machine for drawing a continuous sheet of glass, the combination of a receptacle containing a mass of molten glass, a drawing table, means for clamping the sheet against the table, and means for raising the temperature of the glass sufficiently to cause it to flatten on the drawing table before contact with said clamping means.

14. In an apparatus for drawing sheet glass, the combination of a receptacle containing a mass of molten glass, a drawing table, means coöperating therewith for drawing the glass from said molten mass in sheet form, means partially cooling the drawn sheet adjacent to its formative point, means for reheating the drawn sheet to flattening temperature prior to its reaching the drawing table, whereby the reheated sheet is rendered plastic and flattens upon the drawing table.

15. In a sheet glass drawing mechanism, the combination of a receptacle for molten glass, an endless traveling drawing table, means for applying heat to the drawn sheet to soften the same and cause it to flatten on the table, and means for clamping the sheet against the table after said sheet has flattened thereon.

16. In a sheet glass drawing mechanism, the combination of a receptacle containing a mass of molten glass, a drawing table, means for holding one run of said table flat in a horizontal plane, and clamping means engaging the drawn sheet after said sheet has traveled on a portion of the horizontal run of the table whereby the sheet is permitted to flatten on the table before being clamped thereon.

17. In a sheet glass drawing machine, the combination of a receptacle containing a mass of molten glass, a bending roll above the same, drawing mechanism to one side of the bending roll and adapted to draw a sheet vertically and then bend it over the roll into a horizontal plane, a pair of separated driven rolls between the bending roll and the drawing mechanism upon which rolls the sheet rests, and means directing a flame downward on the sheet when on said intermediate rolls.

18. In a sheet glass drawing mechanism, the combination of a receptacle for molten glass, a bending roll above the same, a drawing and flattening mechanism to one side of the bending roll and approximately in the same horizontal plane as the top of said roll whereby said drawing mechanism draws the sheet of glass vertically from said receptacle over the bending roll and thence horizontally, a support for the sheet between the bending roll and the drawing and flattening mechanism, and means for reheating the sheet to a flattening condition while on said support.

19. The combination with a receptacle for molten glass provided with a drawing opening, an inclosed drawing chamber to one side of said opening, a vertical wall on the opposite side of said drawing opening from said drawing chamber, a horizontal roof or wall extending over said drawing opening from said vertical wall to the drawing chamber, a combustion chamber in the upper part of the vertical wall having lateral ports directing flame outward over said drawing opening, and a combustion chamber in the horizontal wall having downwardly opening ports and directing flame on the horizontal run of the sheet.

20. The combination of an open-topped receptacle for molten glass, an inclosed drawing chamber arranged to one side of said receptacle, a bending roll vertically over said receptacle, sheet-clamping means within said drawing chamber whereby the sheet is drawn vertically over the bending roll and then horizontally into the drawing chamber, a combustion chamber directing flame on the upper part of the vertical portion of said sheet as it is drawn and a second independent combustion chamber directing flame upon the horizontal portion of said sheet adjacent to the bending roll.

21. In a sheet glass drawing mechanism, the combination of a receptacle for molten glass, a bending roll above the same, an inclosed drawing mechanism to one side of the bending roll, an arch over the bending roll open to the atmosphere at its opposite ends and above the bending roll, and means for heating the space beneath the arch.

22. In a sheet glass drawing mechanism, the combination of a receptacle for molten glass, a bending roll above the same, an inclosed drawing mechanism to one side of the bending roll whereby the sheet may be drawn vertically, bent over the bending roll and continuously drawn horizontally, an arch above the bending roll open at its ends to the external atmosphere, means for heating the space beneath the arch at the upper end of the vertical portion of the sheet, and means for heating that portion of the arch above the horizontal run of the sheet.

23. In a sheet glass drawing apparatus, the combination of a receptacle for molten glass, a closed-top drawing chamber above and to one side of said receptacle, a bending roll, a horizontal wall above the bending roll forming a narrow horizontal passage above said roll, and means for directing a gas flame into said chamber downwardly toward the drawn sheet of glass beyond but adjacent to the bending roll.

24. In a sheet glass drawing apparatus, the combination of a receptacle for molten glass, horizontally moving drawing mechanism, a bending roll above said receptacle, and means for cooling the inner face of the sheet just prior to its contact with the bending roll.

25. In a sheet glass drawing apparatus, the combination of a receptacle for molten glass, horizontally moving drawing apparatus engaging the drawn sheet, a bending roll above said receptacle, and cooling means beneath the bending roll for cooling the face of the sheet which contacts with said roll and just prior to such contact.

26. In a sheet glass drawing apparatus, the combination of a receptacle for molten glass, a bending roll above the tank, and means exterior to the roll cooling the exterior surface of said bending roll.

27. In a sheet glass drawing apparatus, the combination of a receptacle for molten glass, a bending roll above said receptacle, and means exterior to the roll for reducing the temperature of said bending roll.

28. In a sheet glass drawing apparatus, the combination of a receptacle for molten glass, a bending roll above said receptacle, means passing a cooling fluid through the roll, and a surface-cooling device for cooling the exterior surface of the roll.

29. In a sheet glass drawing apparatus, the combination of a receptacle for molten glass, a bending roll above said receptacle, and a fluid circulating receptacle arranged adjacent to the under surface of the roll.

30. In a sheet glass drawing apparatus, the combination of a receptacle for molten glass, a drawing table above the level of the glass in said receptacle and at one side of the drawing point, a bending roll above the tank over which the drawn sheet of glass is bent in passing from the tank to the drawing table, and a cooling device arranged adjacent to the under surface of the roll and in proximity to the vertically rising sheet just before it contacts with the bending roll.

31. In a sheet glass drawing apparatus, the combination of a hollow bending roll, and means for passing an air current therethrough and for spraying water therethrough.

32. In a sheet glass drawing apparatus, the combination of a hollow bending roll, and means for cooling the same comprising an air jet discharging into the roll and means for feeding water into the air jet whereby said air jet sprays the water into the roll and cools the same.

33. In a sheet glass drawing apparatus, the combination of means for drawing a sheet of glass, a hollow bending roll, a hollow chamber beneath and adjacent to the roll, means for circulating water through said chamber, and means for directing a cooling air current on the exterior surface of the roll adjacent the water cooler.

34. In a sheet glass drawing apparatus, the combination of a receptacle for molten glass, a drawing table, a bending roll over which the drawn sheet passes from the tank to the drawing table, and means for supplying air for cooling purposes to said roll and sheet just before they contact with each other.

35. In a sheet glass drawing apparatus, the combination of a receptacle for molten glass, a bending roll, means for drawing a sheet of glass vertically from said receptacle over said roll and then horizontally, a drawing table receiving said drawn sheet after it leaves said roll, and means simultaneously cooling the exterior surface of the roll and the face of the sheet adjacent said roll just prior to the contact of said face and roll.

36. In a sheet glass drawing apparatus, the combination of a receptacle for molten glass, means for drawing a sheet of glass therefrom, a roll over which the sheet of glass passes as drawn, and means for simultaneously cooling the exterior surface of the roll and the contacting face of the sheet just previous to the contact between said sheet and roll.

In testimony whereof I affix my signature in presence of two witnesses.

IRVING W. COLBURN.

Witnesses:
JAMES N. ANGUS,
JOSEPH P. CROWLEY.